(12) United States Patent
Hatakeyama (10) Patent No.: US 7,831,839 B2
(45) Date of Patent: Nov. 9, 2010

(54) METHODS AND APPARATUS FOR PROVIDING A SECURE BOOTING SEQUENCE IN A PROCESSOR

(75) Inventor: Akiyuki Hatakeyama, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1227 days.

(21) Appl. No.: 11/347,050

(22) Filed: Feb. 3, 2006

(65) Prior Publication Data

US 2006/0179302 A1    Aug. 10, 2006

Related U.S. Application Data

(60) Provisional application No. 60/650,506, filed on Feb. 7, 2005.

(51) Int. Cl.
*G06F 11/30* (2006.01)
*H04L 9/32* (2006.01)

(52) U.S. Cl. ........................ 713/187; 713/169

(58) Field of Classification Search .......... 713/187, 713/168, 165, 170, 200, 201, 169; 726/1–36; 380/9, 25, 282
See application file for complete search history.

(56) References Cited

U.S. PATENT DOCUMENTS

| | | | |
|---|---|---|---|
| 5,491,788 A * | 2/1996 | Cepulis et al. ............... 714/13 |
| 5,615,263 A | 3/1997 | Takahashi |
| 5,937,063 A | 8/1999 | Davis |
| 6,052,780 A | 4/2000 | Glover |
| 6,185,678 B1 | 2/2001 | Arbaugh et al. |
| 6,526,491 B2 | 2/2003 | Suzuoki et al. |
| 6,754,828 B1 * | 6/2004 | Marisetty et al. ............... 726/2 |
| 6,938,164 B1 | 8/2005 | England |
| 7,093,147 B2 | 8/2006 | Farkas et al. |
| 7,217,310 B2 | 5/2007 | Yahagi |
| 7,219,369 B2 | 5/2007 | Hashimoto |
| 7,530,114 B2 | 5/2009 | Yamada |
| 2002/0073316 A1 * | 6/2002 | Collins et al. ............... 713/174 |
| 2003/0014653 A1 | 1/2003 | Moller et al. |
| 2003/0028794 A1 * | 2/2003 | Miller et al. ............... 713/193 |

(Continued)

FOREIGN PATENT DOCUMENTS

EP    0 606 771 A2    7/1994

(Continued)

OTHER PUBLICATIONS

International Search Report and Written Opinion based on PCT/JP2006/302095, dated Jul. 19, 2006.

(Continued)

*Primary Examiner*—Christopher A Revak
*Assistant Examiner*—Abdullah Almamun
(74) *Attorney, Agent, or Firm*—Matthew B. Dernier, Esq.; Gibson & Dernier LLP (57) ABSTRACT

Methods and apparatus provide for: reading encrypted boot code from a storage medium into a local memory associated with a first of a plurality of processors; decrypting the encrypted boot code using a trusted decryption function of the first processor such that the boot code is verified as being authentic; booting the first processor using the boot code from the local memory; and authenticating boot code for one or more of the other processors in the first processor prior to the one or more other processors booting up.

20 Claims, 4 Drawing Sheets

U.S. PATENT DOCUMENTS

| | | | |
|---|---|---|---|
| 2003/0163723 A1* | 8/2003 | Kozuch et al. | 713/200 |
| 2003/0182571 A1 | 9/2003 | Hashimoto | |
| 2004/0003321 A1* | 1/2004 | Glew et al. | 714/27 |
| 2004/0064457 A1 | 4/2004 | Zimmer et al. | |
| 2004/0083375 A1* | 4/2004 | Foster et al. | 713/189 |
| 2004/0158742 A1* | 8/2004 | Srinivasan et al. | 713/201 |
| 2005/0025390 A1 | 2/2005 | Tsujii | |
| 2005/0166264 A1 | 7/2005 | Yamada | |
| 2005/0166709 A1 | 8/2005 | Yahagi | |
| 2005/0235166 A1 | 10/2005 | England | |
| 2007/0113088 A1* | 5/2007 | Volp | 713/169 |

FOREIGN PATENT DOCUMENTS

| | | |
|---|---|---|
| JP | 09-282155 A | 10/1997 |
| JP | 2002-169787 A | 6/2002 |
| JP | 2002-287978 A | 10/2002 |
| JP | 2003-280989 A | 10/2003 |
| WO | 03-058411 | 7/2003 |
| WO | WO 03/085497 A2 | 10/2003 |
| WO | 2004-099981 A | 4/2004 |
| WO | WO 2004/072787 A2 | 8/2004 |

OTHER PUBLICATIONS

Yee, Bennet; "Using Secure Coprocessors;" Thesis submitted to the School of Computer Science, May 1994; 94 pgs.
International Search Report and Written Opinion based on PCT/JP2006/302107, dated Aug. 4, 2006.
International Search Report and Written Opinion based on PCT/JP2006/302099, dated Jul. 17, 2006.
Office Action of U.S. Appl. No. 11/347,069, May 27, 2009.
Office Action for related Japanese Patent application No. 2006-024770, Jul. 14, 2009.
Office Action for related Japanese Patent application No. 2006-024773, Jul. 14, 2009.
Office Action for related Japanese Patent application No. 2006-024771, Aug. 25, 2009.
Office Action for related U.S. Appl. No. 11/347,069, Dec. 16, 2009.
Office Action for related U.S. Appl. No. 11/347,067, Jun. 29, 2010.
Office Action for Japanese application JP 2006-024773, dated Jun. 1, 2010.

* cited by examiner

METHODS AND APPARATUS FOR PROVIDING A SECURE BOOTING SEQUENCE IN A PROCESSOR

CROSS REFERENCE TO RELATED APPLICATION

This application claims the benefit of U.S. Provisional Patent Application No. 60/650,506, filed Feb. 7, 2005, entitled "Methods And Apparatus For Providing A Secure Booting Sequence In A Processor," the entire disclosure of which is hereby incorporated by reference.

BACKGROUND OF THE INVENTION

The present invention relates to methods and apparatus for providing a secure booting sequence in a processor, and preferably in a multi-processing system.

In recent years, there has been an insatiable desire for faster computer processing data throughputs because cutting-edge computer applications are becoming more and more complex, and are placing ever increasing demands on processing systems. Graphics applications are among those that place the highest demands on a processing system because they require such vast numbers of data accesses, data computations, and data manipulations in relatively short periods of time to achieve desirable visual results. Real-time, multimedia applications also place a high demand on processing systems; indeed, they require extremely fast processing speeds, such as many thousands of megabits of data per second.

While some processing systems employ a single processor to achieve fast processing speeds, others are implemented utilizing multi-processor architectures. In multi-processor systems, a plurality of sub-processors can operate in parallel (or at least in concert) to achieve desired processing results. It has also been contemplated to employ a modular structure in a multi-processing system, where the computing modules are accessible over a broadband network (such as the Internet) and the computing modules may be shared among many users. Details regarding this modular structure may be found in U.S. Pat. No. 6,526,491, the entire disclosure of which is hereby incorporated by reference.

A problem arises, however, when a processing system is used over a network or is part of a shared resource. In particular, the processor and its associated software (such as the boot code) are subject to outside influences such as intentional hacking and the like. A conventional boot-up sequence includes a power-on-reset, importation of configuration data (e.g., initial register data, base address information, etc.) and boot code from a flash ROM, configuration of hardware registers, and booting up the processor. In a multi-processor system, the configuration data and boot code may be shared among a number of processors for initial boot-up. Unfortunately, the boot code is not secure within the flash ROM and a hacker may easily tamper with the configuration data and the boot code prior to boot-up. This can have devastating consequences in a system where sensitive information is being processed. The fact that the boot code may have been tampered with mitigates the effectiveness of any security measures taken after boot up. Indeed, without a secure boot any subsequent security measures cannot be fully trusted. If a hacker tampers with the booting sequence, a subsequent security measure may be usurped.

Accordingly, there are needs in the art for new methods and apparatus for providing secure boot up processes for single and multi-processing systems that ensure a trusted environment from which to launch further security measures.

SUMMARY OF THE INVENTION

Aspects of the invention contemplate methods and apparatus for providing secure boot sequences for single and multi-processor systems. In particular, it is preferred that a processor be capable of reading secure (encrypted) boot code from a storage location (such as a secure flash ROM) and storing same into a local memory associated with the processor. The processor may then decrypt the boot code and continue booting up. In addition, the processor that has been booted in a secure fashion may check/verify the boot code for associated processors (such as the processors in a multi-processing system). After a secure boot-up, a processor may take other security steps, such as entering a secure mode of operation.

For example, in accordance with aspects of the invention, configuration data and boot code may be encrypted in a secure memory that is associated with a particular processor. The encryption is preferably made using a trusted key (e.g., a private key) that is not known to any unauthorized entities. Trusted decryption code (and a decryption key) may also be stored in the same or a different secure memory (e.g., a flash ROM) that is associated with the processor. The decryption capability is preferably hardware-implemented (e.g., software that is burned into the flash ROM or any other suitable hardware device). Once the trusted decryption code is invoked, it may be used to decrypt and verify the configuration data and boot code. Once the configuration data and boot code are decrypted and verified, the processor is booted.

In accordance with further aspects of the present invention, the processor preferably includes a hardware-implemented security function that is invoked after boot-up to place the processor in a secure mode and to establish a secure processing environment. This may involve triggering a state in which no externally-initiated data access request into the processor will be responded to. In other words, the secure processor will not respond to any outside request for data, e.g., a request to read the contents of the local memory or registers of the processor. Thus, when the processor enters a secure mode, it creates a trusted environment in which to launch further security measures.

In a multi-processing system, the configuration data and boot code of the other processors are also subject to tampering. Aspects of the invention contemplate that the trusted environment of the processor having had a secure boot-up may be used to check the configuration data and boot code of the other processors during their boot-up sequences. In one embodiment, the secure configuration data and boot code that has been decrypted within the trusted processor may be compared with the configuration data and boot code read in by the other processors prior to their boot-up. If the configuration data and boot code are verified first, then the resultant boot-up of the other processors may be trusted.

In another embodiment, the secure memory (containing the encrypted configuration data and boot code for the associated processor) may also include validity data (e.g., hash results, a complete copy, etc.) associated with the configuration data and boot code for the other processors. The validity data may be used in the comparison step prior to permitting boot-up of the other processors.

In accordance with at least one aspect of the present invention, methods and apparatus provide for reading encrypted boot code from a storage medium into a local memory associated with a processor; decrypting the encrypted boot code using a trusted decryption function of the processor such that the boot code is verified as being authentic; and booting the processor using the boot code from the local memory. In this regard, it is preferred that neither the trusted decryption function nor the encrypted boot code may be tampered with by external software manipulation.

Preferably verifying the authenticity of the boot code includes executing a hash function to produce a hash result and comparing the hash result with a predetermined hash value. The predetermined hash value may be stored in encrypted form.

The methods and apparatus may also provide for: reading encrypted boot code from a storage medium into a local memory associated with a first of a plurality of processors; decrypting the encrypted boot code using a trusted decryption function of the first processor such that the boot code is verified as being authentic; booting the first processor using the boot code from the local memory; and authenticating boot code for one or more of the other processors in the first processor prior to the one or more other processors booting up.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PRESENT INVENTION

Figure 1:
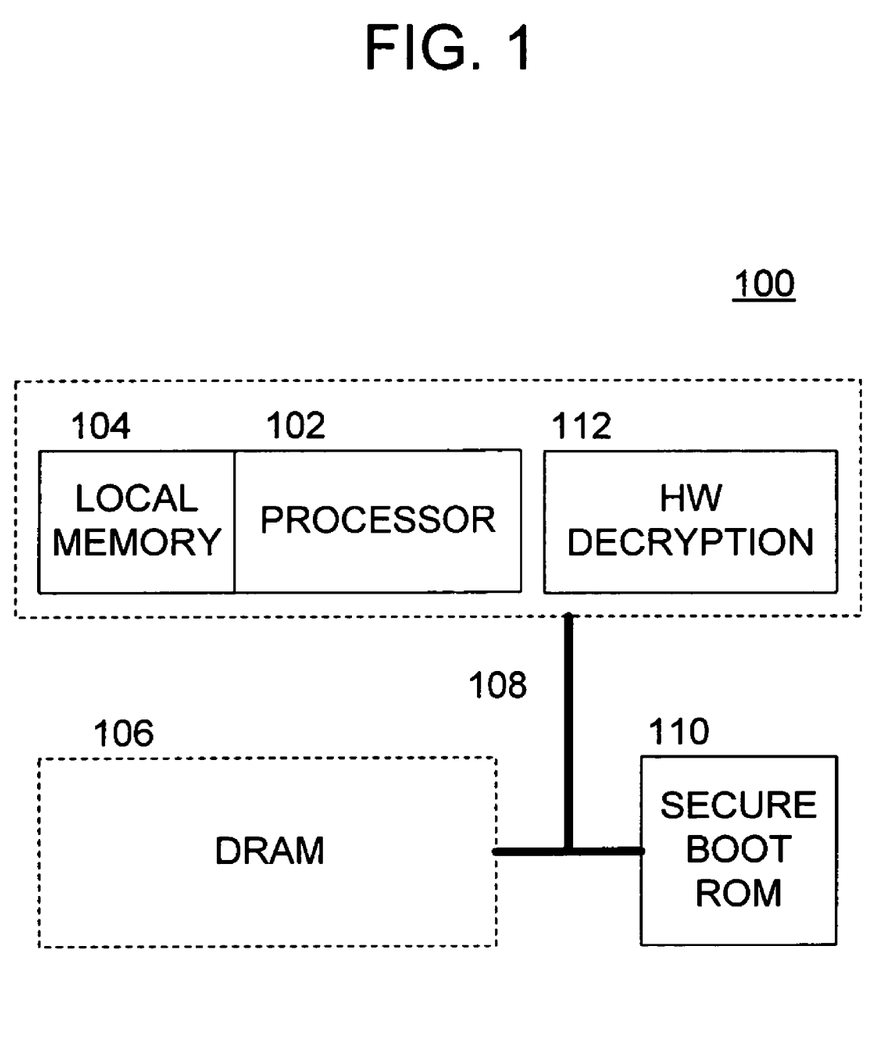
FIG. 1 is a diagram illustrating a processing system in accordance with one or more aspects of the present invention.

With reference to the drawings, wherein like numerals indicate like elements, there is shown in FIG. 1 a processing system 100 suitable for employing one or more aspects of the present invention. For the purposes of brevity and clarity, the block diagram of FIG. 1 will be referred to and described herein as illustrating an apparatus 100, it being understood, however, that the description may readily be applied to various aspects of a method with equal force. The apparatus 100 preferably includes a processor 102, a local memory 104, a system memory 106 (e.g., a DRAM), and a bus 108.

The processor 102 may be implemented utilizing any of the known technologies that are capable of requesting data from the system memory 106, and manipulating the data to achieve a desirable result. For example, the processor 102 may be implemented using any of the known microprocessors that are capable of executing software and/or firmware, including standard microprocessors, distributed microprocessors, etc. By way of example, the processor 102 may be a graphics processor that is capable of requesting and manipulating data, such as pixel data, including gray scale information, color information, texture data, polygonal information, video frame information, etc.

Notably, the local memory 104 is located in the same chip as the processor 102; however, the local memory 104 is preferably not a hardware cache memory in that there are preferably no on chip or off chip hardware cache circuits, cache registers, cache memory controllers, etc. to implement a hardware cache memory function. In alternative embodiments, the local memory 104 may be a cache memory and/or an additional cache memory may be employed. As on chip space is often limited, the size of the local memory 104 may be much smaller than the system memory 106. The processor 102 preferably provides data access requests to copy data (which may include program data) from the system memory 106 over the bus 108 into the local memory 104 for program execution and data manipulation. The mechanism for facilitating data access may be implemented utilizing any of the known techniques, such as direct memory access (DMA) techniques.

It is noted that as used herein, the term "data" is broadly construed to include any type of program code, application software, system level software, any type of data, a data stream, etc.

The apparatus 100 also preferably includes a storage medium, such as secure boot ROM 110 that is operatively coupled to the processor 102, e.g., through the bus 108. The apparatus 100 also preferably includes a decryption unit 112 that is operatively coupled to the processor 102 and operable to decrypt information using a secure decryption key. It is preferred that the processor 102, the local memory 104, and the decryption unit 112 are disposed on a common integrated circuit. Thus, combinations of these elements may be referred to herein as "the processor 102." In an alternative embodiment, the storage medium 110 may also be disposed on the common integrated circuit with one or more of the other elements.

Preferably, the decryption unit is a hardware-implemented device, such as a permanently programmable device (e.g., a flash ROM that has been programmed utilizing an algorithm defining a decryption process). The use of a permanently programmable circuit to implement the decryption unit 112 is desirable to achieve a level of security in which the decryption function cannot be tampered with by external software manipulation.

The storage medium 110 is preferably a secure device, such as a permanently programmable ROM that contains encrypted boot code and/or other data useful in initializing and/or booting up a processor. For example, such additional information may include configuration data (e.g., data utilized to initialize hardware registers), base address data (e.g., information utilized to setup addressing into the system memory 106 and/or the local memory 104), etc. The security of the storage medium (boot ROM) 110 is preferably such that the encrypted boot code and/or other information may not be accessed by unauthorized entities. For example, the encrypted boot code is preferably established during the manufacture of the apparatus 100, whereby the boot code is encrypted utilizing a private encryption key.

Figure 2:
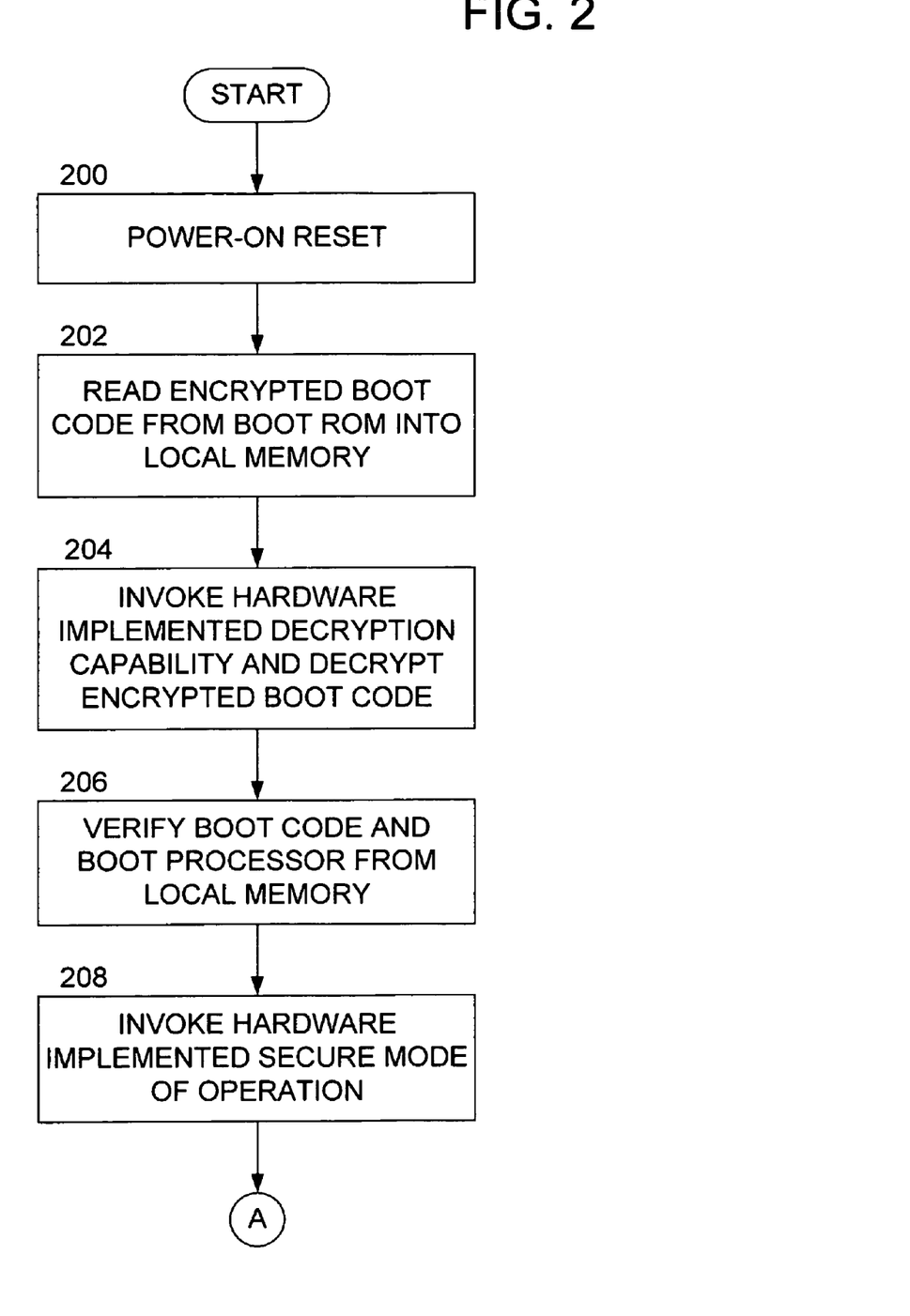
FIG. 2 is a flow diagram illustrating process steps that may be carried out by the processing system of FIG. 1 in accordance with one or more aspects of the present invention.

Reference is now made to both FIGS. 1 and 2, where in general the apparatus 100 is preferably operable to permit the processor 102 to boot-up in a secure fashion during which unauthorized entities may not tamper with the boot process. Thus, the resulting initialized processor and related components may be trusted to launch further security measures.

FIG. 2 illustrates process steps that may be carried out by the apparatus 100 in accordance with one or more aspects of the present invention.

At action 200, the processor 102 receives a power-on reset, which launches the boot-up sequence. At action 202, the processor 102 preferably reads the encrypted boot code from the boot ROM 110 into the local memory 104. As the decryption unit 112 is preferably hardware-implemented, the decryption unit 112 is preferably operable to decrypt the encrypted boot code within the local memory 104. The decryption process itself may verify the boot code (action 206), or additional steps may be taken to achieve such verification. For example, the processor 102 and/or the decryption unit 112 may be operable to verify the authenticity of the boot code by executing a hash function to produce a hash result and to compare the hash result with a predetermined hash value. Assuming that the predetermined hash value is trusted, such comparison may provide assurance that a matching hash result indicates authentic boot code. For example, the predetermined hash result may be stored in encrypted form within the storage medium 110 or within some other storage medium, preferably a secure medium. Once the boot code is verified, the processor 102 preferably boots up and completes its initialization process.

At action 208, the processor 102 preferably automatically enters a secure mode of operation when the boot-up process has been completed. For example, the secure mode of operation is preferably hardware-implemented such that no external, unauthorized efforts to prevent the invocation of the secure mode will be permitted. In this secure mode of operation, no requests for data stored in the local memory 104 (or any other memory devices, registers, etc.) of the processor 102 will be serviced, thereby insuring a trusted environment in which to carry out sensitive operations. Despite being in a secure mode, the processor 102 may request the transfer of data from the system memory 106 into the local memory 104 or vice versa.

Figure 3:
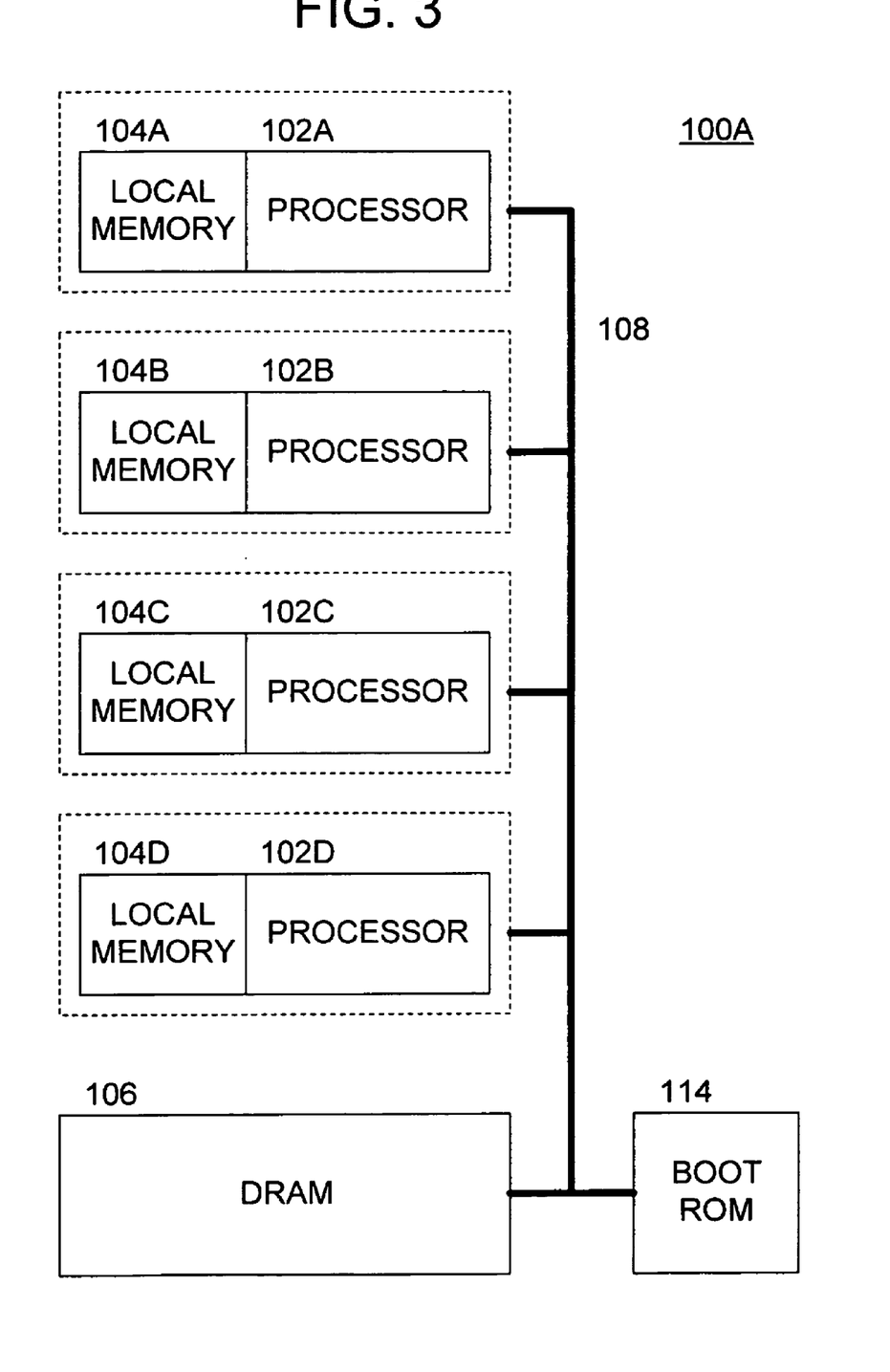
FIG. 3 is a diagram illustrating the structure of a multi-processing system having two or more sub-processors, one or more of which may include a processor having the capabilities of the processor of FIG. 1 in accordance with one or more further aspects of the present invention.

The significance of this secure mode of operation will be discussed in further detail with respect to FIGS. 3 and 4. FIG. 3 is a diagram illustrating the structure of a multi-processing system 100A having two or more sub-processors 102. The concepts discussed hereinabove with respect to FIGS. 1-2 may be applied to the multi-processing system 100A, which includes a plurality of processors 102A-D, associated local memories 104A-D, and a main memory 106 interconnected by way of a bus 108. Although four processors 102 are illustrated by way of example, any number may be utilized without departing from the spirit and scope of the present invention. The processors 102 may be implemented with any of the known technologies, and each processor may be of similar construction or of differing construction.

One or more of the processors 102 preferably includes the capabilities and elements of the processor 102 of FIG. 1. Others of the processors 102 need not include such capabilities, although having such capabilities would not depart from the spirit and scope of the present invention. The apparatus 100A also includes a boot ROM 114, which is not necessarily a secure storage medium and does not necessarily contain encrypted boot code and configuration data; rather, it is contemplated that in a preferred embodiment the boot code and configuration data are in accordance with conventional techniques.

Each of the processors 102 may be of similar construction or of differing construction. The processors may be implemented utilizing any of the known technologies that are capable of requesting data from the shared (or system) memory 106, and manipulating the data to achieve a desirable result. For example, the processors 102 may be implemented using any of the known microprocessors that are capable of executing software and/or firmware, including standard microprocessors, distributed microprocessors, etc. By way of example, one or more of the processors 102 may be a graphics processor that is capable of requesting and manipulating data, such as pixel data, including gray scale information, color information, texture data, polygonal information, video frame information, etc.

One or more of the processors 102 of the system 100 may take on the role as a main (or managing) processor. The main processor may schedule and orchestrate the processing of data by the other processors.

The system memory 106 is preferably a dynamic random access memory (DRAM) coupled to the processors 102 through a memory interface circuit (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 preferably includes a processor core and an associated one of the local memories 104 in which to execute programs. These components may be integrally disposed on a common semi-conductor substrate or may be separately disposed as may be desired by a designer. The processor core is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processor core may include an instruction buffer, instruction decode circuitry, dependency check circuitry, instruction issue circuitry, and execution stages.

Each local memory 104 is coupled to its associated processor core 102 via a bus and is preferably located on the same chip (same semiconductor substrate) as the processor core. The local memory 104 is preferably not a traditional hardware cache memory in that there are no on-chip or off-chip hardware cache circuits, cache registers, cache memory controllers, etc. to implement a hardware cache memory function. As on chip space is often limited, the size of the local memory may be much smaller than the shared memory 106.

The processors 102 preferably provide data access requests to copy data (which may include program data) from the system memory 106 over the bus system 108 into their respective local memories 104 for program execution and data manipulation. The mechanism for facilitating data access may be implemented utilizing any of the known techniques, for example the direct memory access (DMA) technique. This function is preferably carried out by the memory interface circuit.

Figure 4:
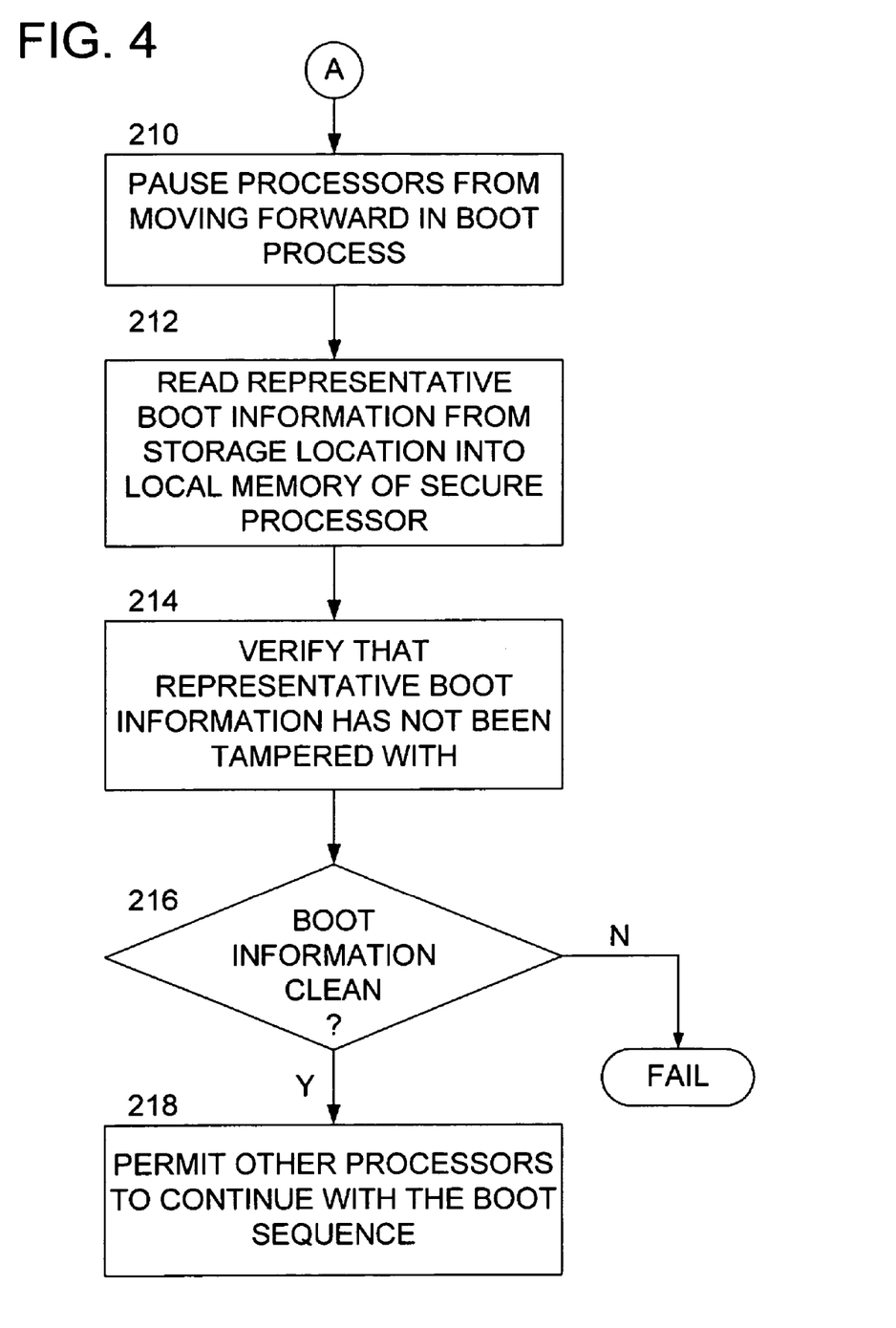
FIG. 4 is a flow diagram illustrating process steps that may be carried out by the processing system of FIG. 3 in accordance with one or more further aspects of the present invention.

With reference to FIG. 4, which is a flow diagram illustrating one or more further process steps that may be carried out by the apparatus 100A of FIG. 3, it is intended that action 210 follows action 208 of FIG. 2. In general, the processor that has booted in a secure fashion is preferably operable to authenticate the boot code for one or more of the other processors 102 prior to the one or more other processors booting up. At action 210, the other processors (e.g., the processors 102 that were not booted in a secure fashion as discussed hereinabove with respect to FIGS. 1-2), are prevented from moving forward in their boot-up processes until the processor that has been securely booted issues a signal indicating that such processes may move forward. By way of background, during the initial power-on reset (action 200, FIG. 2) in accordance with conventional techniques, the boot code and other configuration data is read from the boot ROM 114 and stored in a hardware register (not shown) in each of the processors 102, or alternatively in a common hardware register accessible by all such processors 102. The processors 102, however, are note permitted to move forward in the boot process as discussed above with respect to action 210.

At action 212, the processor 102 that has been securely booted reads the boot code and/or configuration data from the hardware storage location into its local memory 104. At action 214, the processor 102 verifies that the boot code and/or configuration data has not been tampered with. For example, the processor may verify the authenticity of the boot code by executing a hash function to produce a hash result in comparing the hash result with a predetermined hash value. Assuming that the predetermined hash value is trusted, the comparison of the predetermined hash value and the hash result may be relied upon in authenticating the boot code and/or configuration data. Preferably, the predetermined hash value is stored in a secure storage medium, preferably in encrypted form.

At action 216, a determination is made as to whether the boot information (e.g., part or all of the boot code and/or configuration data) is unaltered (e.g., has not been tampered with by unauthorized entities). If the result of the determination is in the negative, then the process flow preferably advances to a failed state in which appropriate action is taken, such as preventing the other processors from booting and/or restarting the process to make an additional attempt at booting. If the result of the determination at action 216 is in the affirmative, then the process flow preferably advances to action 218, where the other processors 102 are permitted to continue with the boot sequence and complete their initialization processes.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

As discussed above, various aspects of the present invention provide for encrypting configuration data and/or boot code and storing same in a secure memory that is associated with a particular processor. Trusted decryption code may also be stored in the same or a different secure memory that is also associated with the processor. The decryption capability is preferably hardware-implemented such that once the trusted decryption code is invoked, it may be used to decrypt and verify the configuration data and boot code. Once the configuration data and boot code are decrypted and verified, the processor is booted.

Advantageously, various aspects of the methods and apparatus of the present invention provide resistance to the tampering of boot code and increase the effectiveness of any security measures taken after boot up. This leads to higher reliability of trusted computing environments and increases the security of sensitive information.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus, comprising:
   a plurality of processors, each with an associated local memory that is operatively coupled to a common main memory, and each processor operating to request at least some data from the main memory for use in its respective local memory, and at least one of the processors including a decryption unit that operates to decrypt information using a secure decryption key; and
   a storage medium containing encrypted boot code, where the encrypted boot code is not accessible by unauthorized entities, wherein:
   the at least one processor operates to read the encrypted boot code from the storage medium into its local memory,
   the decryption unit operates to decrypt the encrypted boot code such that the boot code is verified as being authentic,
   the at least one processor operates to boot up using the boot code from the local memory,
   the at least one processor operates to authenticate boot code for one or more of the other processors prior to the one or more other processors booting up; and
   the one or more other processors operate to pause from booting up until a signal is provided from the at least one processor indicating that the boot code is authentic.

2. The apparatus of claim 1, wherein the at least one processor is operates to read the boot code for the one or more other processors into its local memory and to verify that it has not been tampered with in order to authenticate such boot code.

3. The apparatus of claim 2, wherein the at least one processor operates to verify the authenticity of the boot code for the one or more other processors by executing a hash function to produce a hash result and comparing the hash result with a predetermined hash value.

4. The apparatus of claim 3, wherein the predetermined hash value is stored in encrypted form within the storage medium.

5. The apparatus of claim 1, wherein at least one of:
   the at least one processor, the local memory thereof, and the decryption unit are disposed on a common integrated circuit; and
   the at least one processor, the local memory thereof, the decryption unit, and the storage medium are disposed on a common integrated circuit.

6. The apparatus of claim 5, wherein the decryption unit is hardware-implemented using a permanently programmable circuit chip, which cannot be tampered with by external software manipulation.

7. The apparatus of claim 1, wherein the storage medium operates to prevent tampering with the encrypted boot code by external software manipulation.

8. The apparatus of claim 1, wherein the at least one processor further operates to verify the authenticity of the boot code for the at least one processor by executing a hash function to produce a hash result and comparing the hash result with a predetermined hash value.

9. The apparatus of claim 8, wherein the predetermined hash value is stored in encrypted form within the storage medium.

10. The apparatus of claim 1, wherein the processor further operates to automatically enter into a secure mode of operation after boot up.

11. A method, comprising:
reading encrypted boot code from a storage medium into a local memory associated with a first of a plurality of processors;
decrypting the encrypted boot code using a trusted decryption function of the first processor such that the boot code is verified as being authentic;
booting the first processor using the boot code from the local memory; and
authenticating boot code for one or more of the other processors in the first processor prior to the one or more other processors booting up,
wherein the one or more other processors operate to pause from booting up until a signal is provided from the first processor indicating that the boot code is authentic.

12. The method of claim 11, further comprising preventing the one or more other processors from booting up until the signal is provided from the first processor.

13. The method of claim 11, further comprising reading the boot code for the one or more other processors into the local memory of the first processor and verifying that it has not been tampered with in order to authenticate such boot code.

14. The method of claim 13, wherein the step of verifying the authenticity of the boot code for the one or more other processors includes executing a hash function to produce a hash result and comparing the hash result with a predetermined hash value.

15. The method of claim 14, wherein the predetermined hash value is stored in encrypted form.

16. The method of claim 11, wherein neither the trusted decryption function nor the encrypted boot code can be tampered with by external software manipulation.

17. The method of claim 11, further comprising verifying the authenticity of the boot code for the first processor by executing a hash function to produce a hash result and comparing the hash result with a predetermined hash value.

18. The method of claim 17, wherein the predetermined hash value is stored in encrypted form.

19. The method of claim 11, wherein the processor automatically enters into a secure mode of operation after boot up.

20. A non-transitory computer readable storage medium containing a software program that causes a processor to perform actions, comprising:
reading encrypted boot code from a storage medium into a local memory associated with a first of a plurality of processors;
decrypting the encrypted boot code using a trusted decryption function of the first processor such that the boot code is verified as being authentic;
booting the first processor using the boot code from the local memory; and
authenticating boot code for one or more of the other processors in the first processor prior to the one or more other processors booting up,
the one or more other processors operate to pause from booting up until a signal is provided from the first processor indicating that the boot code is authentic.

* * * * *